US012160039B2

(12) United States Patent
Cai et al.

(10) Patent No.: US 12,160,039 B2
(45) Date of Patent: Dec. 3, 2024

(54) UNIT CELL ANTENNA FOR PHASED ARRAYS

(71) Applicant: The Boeing Company, Chicago, IL (US)

(72) Inventors: Lixin Cai, Ravensdale, WA (US); Alec Adams, Seattle, WA (US)

(73) Assignee: The Boeing Company, Chicago, IL (US)

( * ) Notice: Subject to any disclaimer, the term of this patent is extended or adjusted under 35 U.S.C. 154(b) by 249 days.

(21) Appl. No.: 17/671,554

(22) Filed: Feb. 14, 2022

(65) Prior Publication Data

US 2023/0261371 A1 Aug. 17, 2023

(51) Int. Cl.
*H01Q 1/52* (2006.01)
*H01Q 1/28* (2006.01)
*H01Q 21/06* (2006.01)

(52) U.S. Cl.
CPC ........... *H01Q 1/523* (2013.01); *H01Q 21/062* (2013.01); *H01Q 1/28* (2013.01)

(58) Field of Classification Search
CPC ............ H01Q 1/28; H01Q 1/286; H01Q 1/38; H01Q 1/523; H01Q 5/15; H01Q 9/16; H01Q 9/26; H01Q 21/0006; H01Q 21/062
See application file for complete search history.

(56) References Cited

U.S. PATENT DOCUMENTS

2018/0040955 A1* 2/2018 Vouvakis ............... H01Q 9/065
2019/0326685 A1 10/2019 Adams et al.
2021/0203085 A1* 7/2021 Jordan ..................... H01Q 5/48

FOREIGN PATENT DOCUMENTS

CN 111262021 A 6/2020
CN 112290204 A 1/2021

OTHER PUBLICATIONS

European Communication for Application No. 23156217.4, dated Jun. 15, 2023, 7 pages.

* cited by examiner

*Primary Examiner* — Robert Karacsony
(74) *Attorney, Agent, or Firm* — Jordan IP Law, LLC

(57) ABSTRACT

An antenna element and an antenna array including the antenna element for generating or receiving a radio frequency (RF) signal are provided. The antenna element includes a dielectric layer including a first surface and a second surface opposite the first surface; a first dipole antenna comprising a first antenna segment and a second antenna segment, the first dipole antenna formed in the second surface; a second dipole antenna comprising a first antenna segment and a second antenna segment, the second dipole antenna formed in the second surface; a coupling segment capacitively coupled to each of the second antenna segment of the first dipole antenna and the second antenna segment of the second dipole antenna; and a shorting pin capacitively coupled to the coupling segment and extending from the first surface to the second surface.

20 Claims, 8 Drawing Sheets

UNIT CELL ANTENNA FOR PHASED ARRAYS

BACKGROUND

A phased array antenna ("PAA") is a type of antenna that includes a plurality of sub-antennas (generally known as unit cells, antenna elements, array elements, or radiating elements of the combined antenna) that are arranged in an orderly grid within the PAA. The relative amplitudes and phases of the respective signals feeding the array elements may be varied in a way that the effect on the total radiation pattern of the PAA is reinforced in desired directions and suppressed in undesired directions. In other words, a beam may be generated, or formed, that may be pointed in or steered into different directions. Beam pointing in a transmit or receive PAA is achieved by controlling the amplitude and phase of the transmitted or received signal from each antenna element in the PAA. The individual radiated signals are combined to form the constructive and destructive interference patterns produced by the PAA that result in one or more antenna beams. The PAA may then be used to point the beam, or beams, rapidly in azimuth and elevation.

PAAs can be connected to various electronics that perform the beam forming and beam pointing. The PAAs are provided such that the PAAs can both transmit and receive radio frequency (RF) energy. In a transmit mode, electrical signals generated by the connected electronics are fed to the antenna elements, which convert the electrical signals into radiant energy. In a receive mode, each of the antenna elements capture some portion of the RF energy from incoming signals and convert the RF energy into separate electrical signals that are fed to the connected electronics. Current solutions utilize narrow gaps between adjacent antenna elements to realize the necessary capacitance for low frequency and extension. However, these narrow gaps are difficult and expensive to manufacture when the design is scaled to millimeter-wave (mmWave) frequencies of operation.

SUMMARY

The disclosed examples are described in detail below with reference to the accompanying drawing figures and listed below. The following summary is provided to illustrate examples or implementations disclosed herein. It is not meant, however, to limit all examples to any particular configuration or sequence of operations.

In one implementation, an antenna element for generating or receiving a radio frequency (RF) signal is provided. The antenna element includes a dielectric layer including a first surface and a second surface opposite the first surface; a first dipole antenna comprising a first antenna segment and a second antenna segment, the first dipole antenna formed in the second surface; a second dipole antenna comprising a first antenna segment and a second antenna segment, the second dipole antenna formed in the second surface; a coupling segment capacitively coupled to each of the second antenna segment of the first dipole antenna and the second antenna segment of the second dipole antenna; and a shorting pin coupled to the coupling segment and extending from the first surface to the second surface.

Other technical features may be readily apparent to one skilled in the art from the following figures, descriptions, and claims.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Corresponding reference characters indicate corresponding parts throughout the accompanying drawings.

DETAILED DESCRIPTION

Figure 1A:
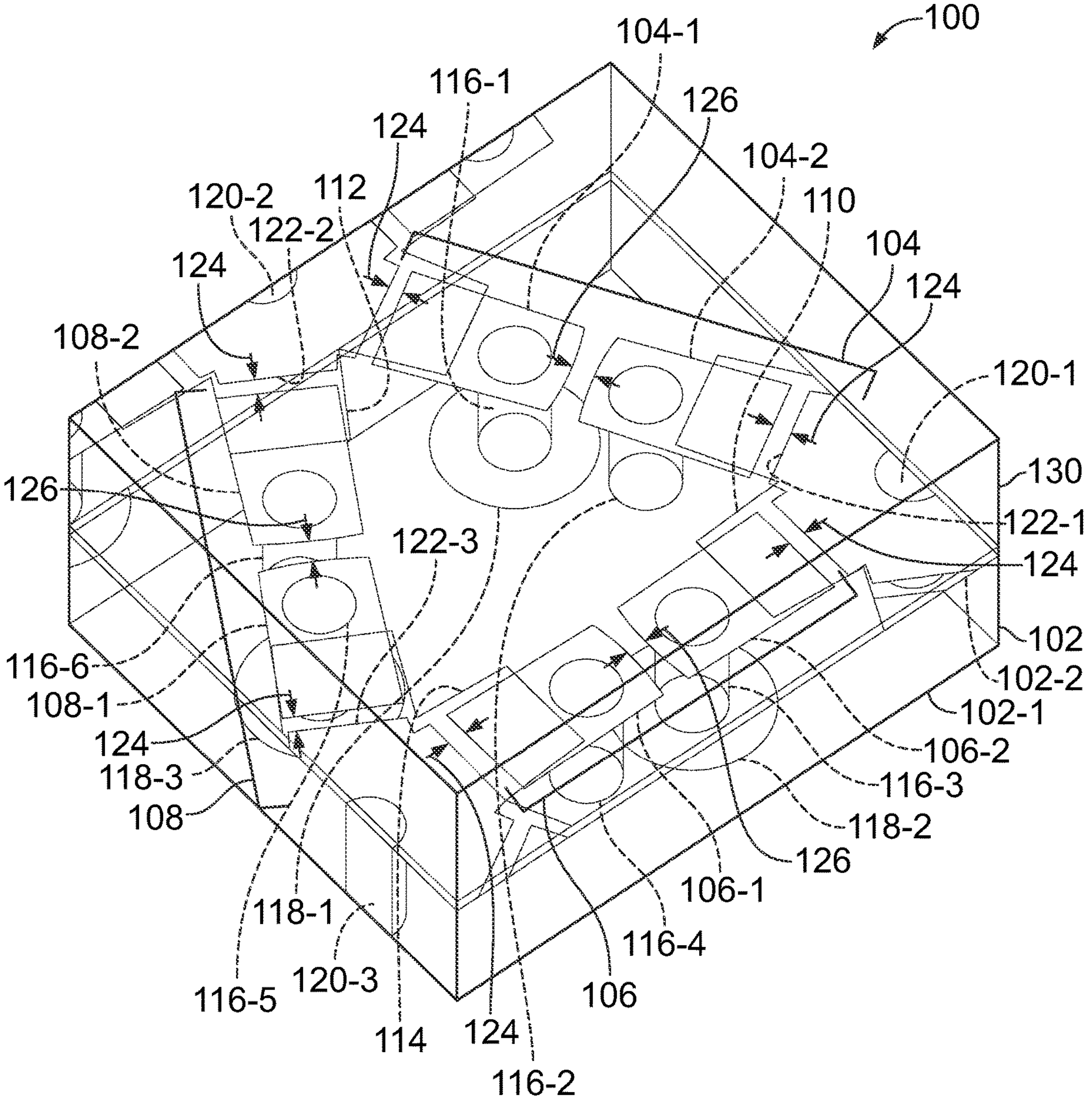
FIG. 1A illustrates a perspective view of a unit cell of an antenna array according to various implementations of the present disclosure.

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all implementations.

As referenced herein, a phased array antenna (PAA) includes multiple emitters and is used for beamforming in high-frequency RF applications, such as in radar, 5G, or myriad other application. The number of emitters in a PAA can range from a few into the thousands. The goal in using a PAA is to control the direction of an emitted beam by exploiting constructive interference between two or more radiated signals. This is known as "beamforming" in the antenna community. More specifically, a PAA enables beamforming by adjusting the phase difference between the driving signal sent to each emitter in the array. This allows the radiation pattern to be controlled and directed to a target without requiring any physical movement of the antenna. This means that beamforming along a specific direction is an interference effect between quasi-omnidirectional emitters (e.g., dipole antennas).

Current solutions utilize radiating dipole antenna elements arranged to form a unit cell. A plurality of unit cells can then be arranged to collectively form an ultra-wideband electronically scanned PAAs in a triangular lattice array having almost any desired size and antenna aperture. The dipole antenna elements utilize narrow gaps, sometimes one or two millimeters wide, between adjacent dipole antenna elements to realize the necessary capacitance for low frequency and extension. Furthermore, when manufacturing the design to scale for mmWave frequencies of operation, the already narrow gaps become even more narrow and are difficult and expensive to manufacture.

Accordingly, implementations of the present disclosure recognize and take into account the challenges associated with manufacturing and operating PAAs in mmWave frequencies. Therefore, the present disclosure provides an ultra-wideband electronically scanned PAAs in a triangular lattice array that includes one or more printed metallic segments capacitively coupled to dipole antenna elements, eliminating the need for narrow inter-dipole gaps. The ultra-wideband electronically scanned PAAs further include one or more shorting pins connected to one or more of the printed metallic segments to suppress unwanted common modes, or blind spots, and extend a high frequency end of operation without compromising low frequency extension. In so doing, RF performance is improved over ultra-wide frequency bandwidth and large scan volumes while reducing associated manufacturing costs.

In some implementations, the ultra-wideband electronically scanned PAAs send and receive RF signals to and from, respectively, airborne or mobile vehicles without implementing mechanical moving parts. In some implementations, the ultra-wideband electronically scanned PAAs are utilized in communications systems and other applications including sensors, Active Electronically Scanned Arrays (AESAs) that utilize solid state transmit/receive modules (TRMs), Radio Detection and Ranging (RADAR) that utilizes AESAs, and/or electronic warfare (EW), such as military and/or commercial mobile communications. The ultra-wideband electronically scanned PAAs therefore provides a high-performance, light-weight, low-profile, and affordable solution to meet challenging and evolving mission requirements.

Phased arrays are useful in providing bi-directional communication capabilities to mobile platforms due to the ability to perform beamforming without mechanically moving the antenna. For example, an aircraft in flight may utilize a phased array antenna to communicate with one or more satellites by electronically steering the phased array antenna to track a satellite rather than mechanically moving an antenna. While the aircraft is in flight, the pitch, yaw, and roll of the aircraft can be compensated for electronically using electronic steering of the phased array rather than mechanical steering of a traditional antenna. This improves the reliability of the data connection. In EW applications, the phased array can operate as a jammer using beamforming directed at a target. Ultra-wideband provides additional capabilities in engaging frequency-diverse targets. In receive-only mode such as Signal Intelligence (SigInt), ultra-wideband covers signals of interest over a wider frequency spectrum.

In some implementations, the ultra-wideband electronically scanned PAAs are implemented using printed circuit board (PCB) fabrication techniques to provide flexibility in the design of the phased array and the integration of Radio Frequency (RF) circuits. In some cases, unit cells for the phased array are formed from PCBs that include antenna elements. These unit cells may be combined as desired to form an array of PCBs, thereby allowing for flexibility in the geometry of the phased array.

Figure 1B:
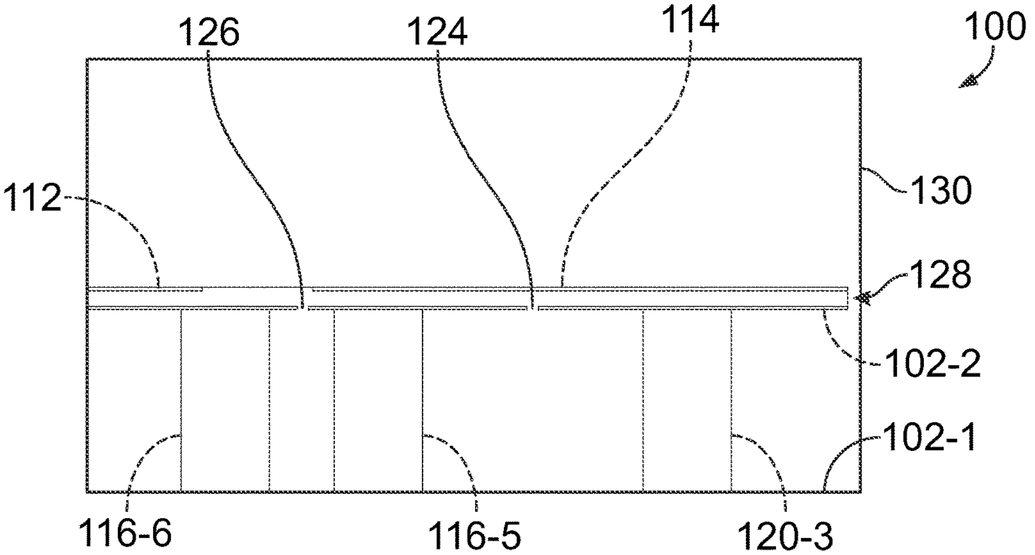
FIG. 1B illustrates a side view of a unit cell of an antenna array according to various implementations of the present disclosure.
Figure 1C:
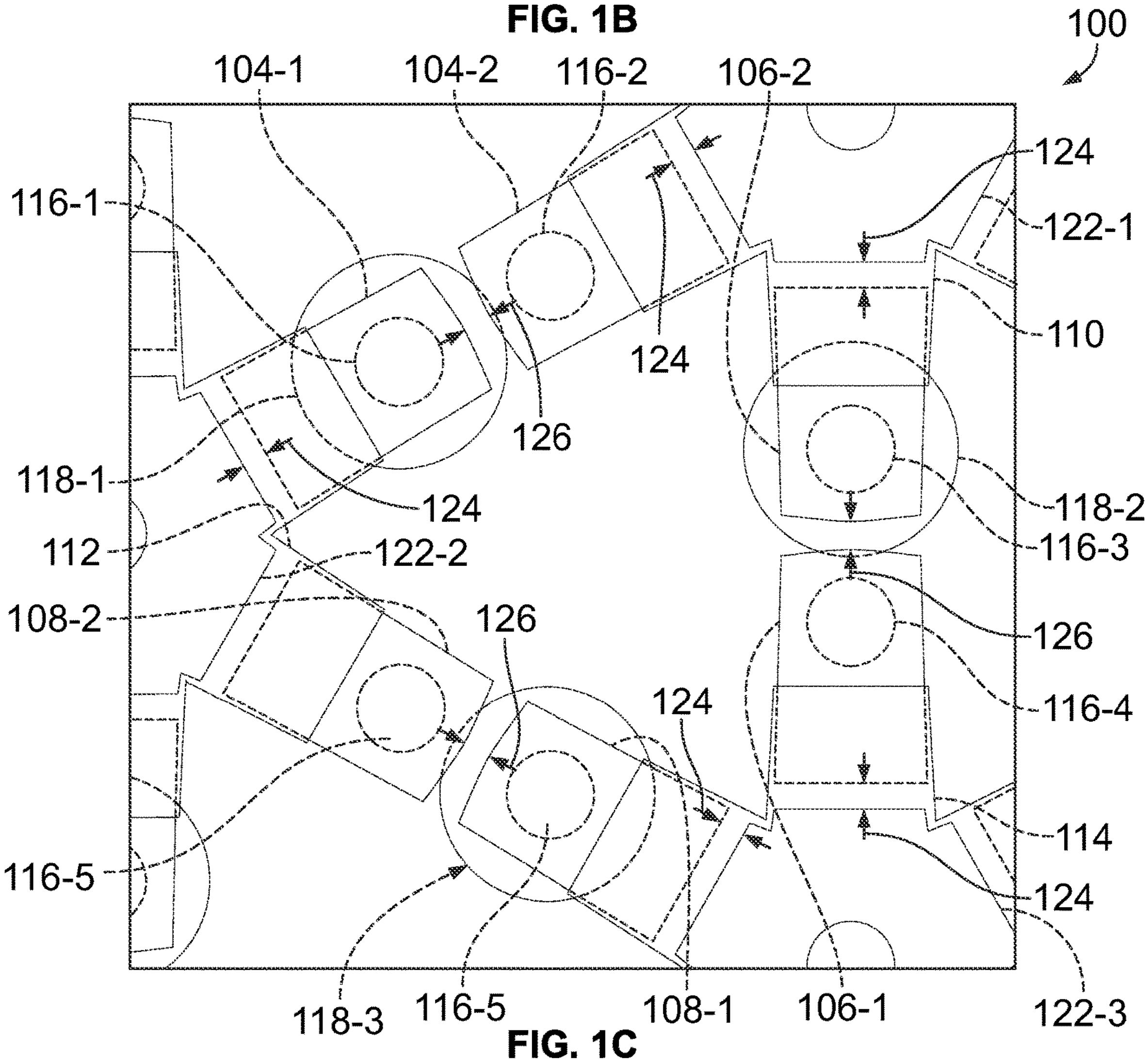
FIG. 1C illustrates a top view of a unit cell of an antenna array according to various implementations of the present disclosure.

FIGS. 1A-1C illustrate a unit cell of an antenna array according to various implementations of the present disclosure. FIG. 1A illustrates a perspective view of the unit cell 100, FIG. 1B illustrates a side view of the unit cell 100, and FIG. 1C illustrates a top view of the unit cell 100. The unit cell 100 illustrated in FIGS. 1A-1C is for illustration only. Various elements can be added to the unit cell 100, omitted from the unit cell 100, and so forth without departing from the scope of the present disclosure.

As described herein, the unit cell 100 can be an RF building block for a phased antenna array (PAA), such as the antenna array 200 described in greater detail below. For example, where one or more unit cells 100 are implemented on a PCB, then individual PCBs forming the unit cells may be arranged in an array to form a PAA.

The unit cell 100 includes a first layer 102 and a second layer 130. The first layer 102 comprises a dielectric substrate and can be referred to as the bottom layer. However, depending on the orientation from which the unit cell 100 is viewed, the first layer 102 can appear to be presented on a side or top of the unit cell 100. The first layer 102 includes a thin metal coating on a bottom surface 102-1 to form a signal ground and a metal coating on a top surface 102-2 where edge-coupled radiating dipole antennas are etched.

The second layer 130 is provided opposite the first layer 102. The second layer 130 comprises a dielectric superstrate and can be referred to as the top layer. However, depending on the orientation from which the unit cell 100 is viewed, the second layer 130 can appear to be presented on a side or top of the unit cell 100. The second layer 130 improves overall scan performance and serves as an environmental shield against corrosion.

The unit cell 100 further includes a plurality of dipole antennas 104, 106, 108 that are the edge-coupled radiating dipole antennas etches in the top surface 102-2 of the first layer 102. In other words, each of the dipole antennas 104, 106, 108 are formed, or etched, in the top surface 102-2. Each dipole antenna 104, 106, 108 includes two separate dipole segments. For example, the unit cell 100 includes a first dipole antenna 104 that includes a first dipole segment 104-1 and a second dipole segment 104-2, a second dipole antenna 106 that includes a first dipole segment 106-1 and a second dipole segment 106-2, and a third dipole antenna 108 that includes a first dipole segment 108-1 and a second dipole segment 108-2. In some implementations, each dipole segment is referred to as an arm. For example, the first dipole segment 104-1 can be referred to herein as a first dipole arm, the second dipole segment 104-2 can be referred to herein as a second dipole arm, and so forth. The first and second segments of each dipole antenna are separated by respective gaps 126. For example, the first dipole segment 104-1 and second dipole segment 104-2 are separated by a gap 126, the first dipole segment 106-1 and second dipole segment 106-2 are separated by a gap 126, and the first dipole segment 108-1 and second dipole segment 108-2 are separated by a gap 126.

The first layer 102 further includes a plurality of metallic segments 122 etched in the top surface 102-2. In particular, the metallic segments 122 include a first metallic segment 122-1, a second metallic segment 122-2, and a third metallic segment 122-3. The metallic segments 122 provide an intersection for the dipole antennas 104, 106, and 108. In some implementations, the dipole antennas 104, 106, and 108 paired with the metallic segments 122 create an equilateral triangle. As described in greater detail below, the combination of the metallic segments 122 and the shorting pins 120, described below, suppresses unwanted common mode resonances by providing a shorter common mode path to ground, pushing the resonance higher in frequency, and out of the band of interest, and extending the high frequency impedance match of an antenna including the unit cell 100.

Each metallic segment 122 is capacitively coupled to two dipole antennas within the unit cell 100 with a gap 124 between the metallic segment 122 and the dipole antenna. For example, the metallic segment 122-1 is capacitively coupled to the dipole antenna 104-2 by a gap 124 and to the dipole antenna 106-2 by a gap 124, the metallic segment 122-2 is capacitively coupled to the dipole antenna 104-1 by a gap 124 and to the dipole antenna 108-2 by a gap 124, and the metallic segment 122-3 is capacitively coupled to the dipole antenna 106-1 by a gap 124 and to the dipole antenna 108-1 by a gap 124.

The unit cell 100 further includes a plurality of printed metallic coupling segments at the top surface 102-2 of the first layer 102, each of which are respectively capacitively coupled to two dipole antennas. For example, as illustrated in FIG. 1A, the unit cell 100 includes a first coupling segment 110, a second coupling segment 112, and a third coupling segment 114. The first coupling segment 110 is capacitively coupled to the first dipole antenna 104 and the second dipole antenna 106, the second coupling segment 112 is capacitively coupled to the first dipole antenna 104 and the third dipole antenna 108, and the third coupling segment 114 is capacitively coupled to the second dipole 106 and the third dipole antenna 108. In some implementations, the coupling segments 110, 112, 114 are comprised of a metallic material, for example copper. The coupling segments 110, 112, 114 capacitively load the respective dipole antennas 104, 106, 108 to offset inductance of the ground plane, i.e., the bottom surface 102-1 of the first layer 102, and increase the lower cutoff point of the impedance bandwidth.

In some implementations, the coupling segments 110, 112, 114 are provided above the dipole antennas 104, 106, 108 and the metallic segments 122 such that the dipole antennas 104, 106, 108 and the metallic segments 122 are provided between the coupling segments 110, 112, 114 and the bottom surface 102-1. In other implementations, the coupling segments 110, 112, 114 and the metallic segments 122 are provided below the dipole antennas 104, 106, 108 such that the coupling segments 110, 112, 114 and the metallic segments 122 are provided between the dipole antennas 104, 106, 108 and the bottom surface 102-1. By provide a respective coupling segment to each junction between dipole antennas, the need for narrow inter-dipole gaps between the coupling segments 110, 112, 114 is removed. The coupling segments 110, 112, 114 further increase the capacitive coupling between the respective dipole antennas to further improve low frequency impedance match.

As illustrated in FIG. 1B, the coupling segments 110, 112, 114 are provided between the first layer 102 and the second layer 130. For example, when the unit cell 100 is viewed from the side as presented in FIG. 1B, the first layer 102 is the bottom layer, the coupling segments 112 and 114 are provided above the first layer 102, and the second layer 130 is provided above the coupling segments 112 and 114.

The unit cell 100 further includes a plurality of vias 116. The vias 116 traverse through the first layer 102 between the bottom surface 102-1 and the top surface 102-2 at the dipole antennas 104, 106, 108. Each dipole antenna 104, 106, 108 is connected to one via 116 to ground the dipole antenna 104, 106, 108 and another via 116 to connect to a coaxial feedline. In other words, for each dipole antenna, one arm is grounded by one metallic via through the substrate and the other arm is connected to the coaxial feedline by another via. This provides an economical and effective way to feed the dipole antennas over 2:1 bandwidth or more.

In some implementations, the coaxial feedline is an electrical feed line that provides electrical supply to excite the dipole antennas 104, 106, 108. When transmitting RF signals, the coaxial feedline supplies the RF power to generate electrical resonance in the respective dipole antenna 104, 106, 108 that then generates the desired RF signal. When receiving RF signals, the coaxial feedline receives RF power induced in the respective dipole antenna 104, 106, 108 when receiving an RF signal. In some implementations, the coaxial feedlines excite orthogonal dual-linear polarizations necessary for some applications. In other implementations, a dual or single circular polarization may be required.

For example, as shown in FIG. 1A, the first dipole segment 104-1 is connected to the via 116-1 to ground the first dipole antenna 104 and the second dipole segment 104-2 is connected to the via 116-2, through which the coaxial feedline is connected to the first dipole antenna 104. Likewise, the first dipole segment 106-1 is connected to the via 116-3 to ground the second dipole antenna 106 and the second dipole segment 106-2 is connected to the via 116-4, through which the coaxial feedline is connected to the second dipole antenna 106, and the first dipole segment 108-1 is connected to the via 116-5 to ground the third dipole antenna 108 and the second dipole segment 108-2 is connected to the via 116-6, through which the coaxial feedline is connected to the third dipole antenna 108.

The vias that are used to ground the dipole antennas, e.g., the vias 116-1, 116-3, and 116-5, contact the thin metal coating on the bottom surface 102-1 via relief cutouts 118. The relief cutouts 118 may be formed by etching portions of the thin metal coating on the bottom surface 102-1 to create holes in the bottom surface 102-1 where the vias 116-1, 116-3, and 116-5 can extend to the top surface 102-2. In particular, as illustrated in FIG. 1A, the via 116-1 corresponds to a first relief cutout 118-1, the via 116-3 corresponds to a second relief cutout 118-2, and the via 116-5 corresponds to a third relief cutout 118-3.

The unit cell 100 further includes a plurality of shorting pins 120. The shorting pins 120 are comprised of a printed metallic structure. For example, the shorting pins 120 can be comprised of copper. Each shorting pin 120 traverses through the first layer 102 between the bottom surface 102-1 and the top surface 102-2 to one of the metallic segments 122. For example, a first shorting pin 120-1 is coupled to the first metallic segment 122-1, a second shorting pin 120-2 is coupled to the second metallic segment 122-2, and a third shorting pin 120-3 is coupled to the third metallic segment 122-3.

In some implementations, each of the shorting pins 120 are capacitively coupled to the respective coupling segment 110, 112, 114. For example, the shorting pin 120-1 is capacitively coupled to the coupling segment 110, shorting pin 120-2 is capacitively coupled to the coupling segment 112, and shorting pin 120-3 is capacitively coupled to the coupling segment 114. For example, a gap 128 is provided between the shorting pin 120 and its respective coupling segment 110, 112, 114. In other implementations, the shorting pins 120 can be directly connected, or coupled, to the respective coupling segment 110, 112, 114, eliminating the gap 128.

By implementing the shorting pins 120, unwanted common modes, or blind spots, are suppressed and extend the higher frequency without compromising low frequency extension because the addition of the shorting pins 120 provides a shorter path from the metallic segment 122 to the ground plane, i.e., the bottom surface 102-1 of the first layer 102 than if the path required traversing from the via, across the dipole antenna, and to the metallic segment 122. For example, the shorting pin 120-3 provided between the bottom surface 102-1 to the metallic segment 122-3 enables a shorter path than to the top surface 102-2 than traversing from the bottom surface 102-1 to the via 116-4, to the dipole antenna 106-1, and across the gap 124 to the metallic segment 122-3. Accordingly, the shorting pins 120 increase performance at higher frequency bands and the coupling segments 110, 112, 114 increase performance at lower frequency bands, extending both high and low frequency performance.

As shown in FIGS. 1A and 1C, the ground reactance and capacitively-coupled radiating dipoles reactance are tuned to partially cancel each other, leading to a stable and well-behaved active impedance match over ultra-wide bandwidth and large scan volume. The dipole antennas 104, 106, 108 and their respective coaxial feeds are provided in a triangular shape that enables the formation of circularly-polarized radio wave at the antenna aperture by properly adjusting the amplitude and phase or time delay of RF signal into or from each coaxial feedline. The triangular arrangement also provides a more symmetrical rejection of cross polarization and/or better axial ratio performance over scan azimuth compared to non-triangular designs.

As illustrated in FIG. 1B, the angles between the respective dipole antennas 104, 106, 108 are approximately sixty degrees as in an equilateral triangular. For example, the first dipole antenna 104 is provided at a sixty degree angle relative to each of the second and third dipole antennas 106, 108 and the second dipole antenna 106 is provided at a sixty degree angle relative to the third dipole antenna 108. However, these implementations are provided for illustration only and should not be construed as limiting. The dipole antennas 104, 106, 108 can be provided at angles other than sixty degrees without departing from the scope of the present disclosure.

In some implementations, the horizontal dimensions of the unit cell 100 are defined so as to meet the maximum scale angle requirement over a frequency band while the vertical distance from the dipole antennas 104, 106, 108 to the horizontal ground plane, i.e., the bottom surface 102-1, is defined so as to re-direct backward radiation to the forward direction and to provide an additional mechanism for impedance bandwidth tuning. The gap sizes between dipole antennas 104, 106, 108 and coupling segments 110, 112, 114, dipole antenna 104, 106, 108 and coupling segments 110, 112, 114 shapes and widths, and the electrical thickness of the second layer 130 provide other tuning opportunities to improve overall scan performance.

In some implementations, as described herein, a coaxial feedline is provided between each dipole antenna 104, 106, 108 and the top surface 102-2. In other implementations, rather than a coaxial feedline, a stripline with a coaxial transition is provided. The coaxial feedline, or stripline with coaxial transition, is connected to active electronics including low-noise and power amplifiers, time-delay or beam-steering devices and other signal-conditioning devices to form an active electronically-scanning antenna system.

In some implementations, the unit cell 100 is referred to as an antenna element. In other implementations, the individual elements of the unit cell 100, i.e., the first layer 102, dipole antennas 104, 106, 108, coupling segments 110, 112, 114, vias 116, relief cutouts 118, shorting pins 120, and second layer 130, are each referred to herein as individual antenna elements.

Figure 2:
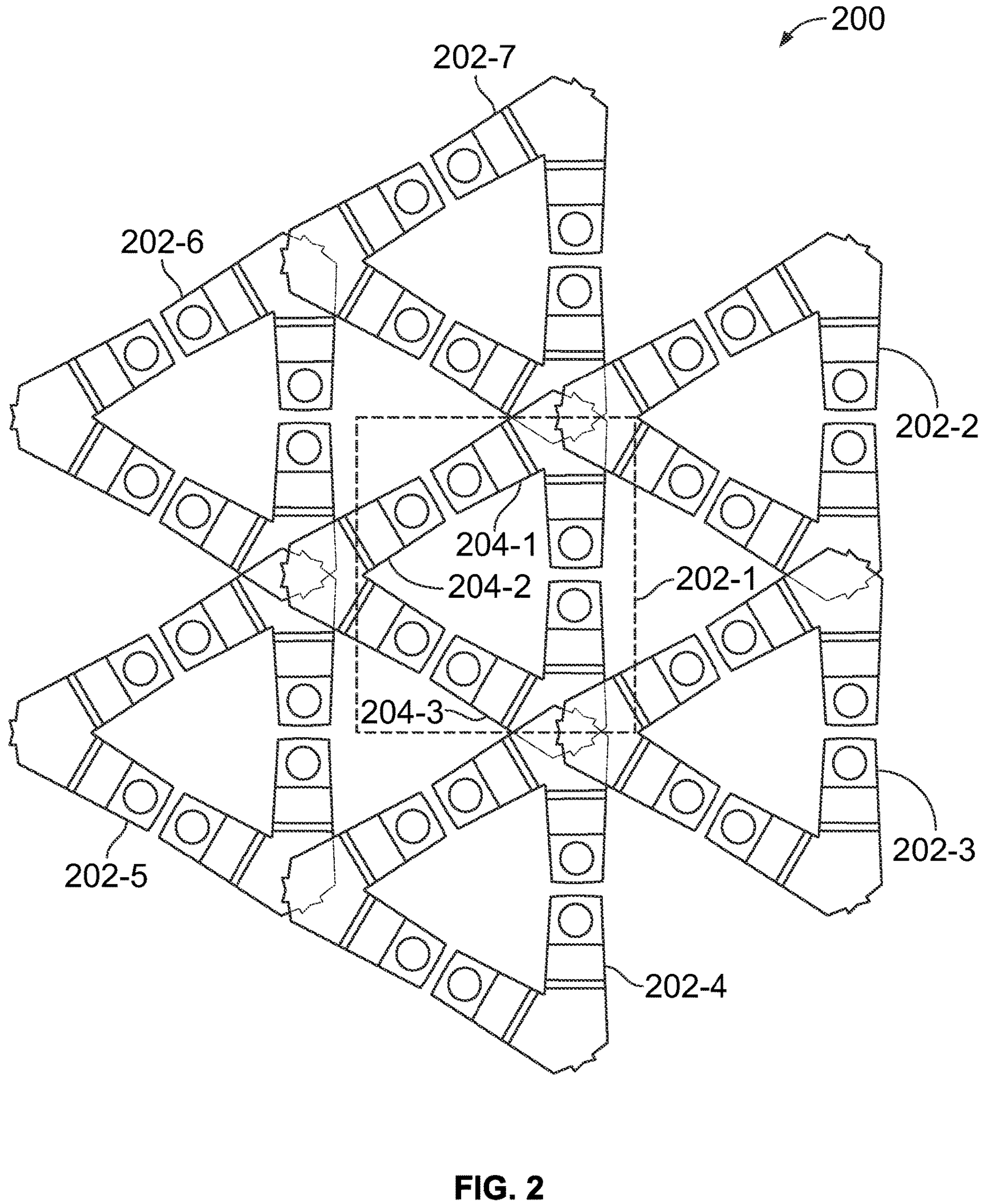
FIG. 2 illustrates a top view of an antenna array including a plurality of unit cells according to various implementations of the present disclosure.

FIG. 2 illustrates a top view of an antenna array including a plurality of unit cells according to various implementations of the present disclosure. The antenna array 200 illustrated in FIG. 2 is for illustration only. Various elements can be added to the antenna array 200, omitted from the antenna array 200, and so forth without departing from the scope of the present disclosure.

In some implementations, the antenna array 200 is a PAA. As shown in FIG. 2, the antenna array 200 includes a plurality of unit cells 202 arranged, or provided, in a common plane. In other words, each of the unit cells 202 are provided in the same plane within the array. In some implementations, each of the unit cells 202-1, 202-2, 202-3, 202-4, 202-5, 202-6, 202-7 is an example of the unit cell 100. The antenna array 200 illustrated in FIG. 2 is provided with the unit cells 202 in a triangular lattice array arrangement. However, various implementations are possible. In some implementations, the antenna array 200 can be provided in a quasi-circular, quasi-elliptical, rhombic, or any other suitable arrangement using the unit cells 202. Although seven unit cells 202 are illustrated in FIG. 2, it should be understood that more or fewer unit cells 202 can be implemented in the antenna array 200 according to application or mission requirements for which the antenna array 200 is implemented.

The antenna array 200 includes a plurality of coupling segments 204. Each of the plurality of coupling segments 204 can be the coupling segment 110. The coupling segment 204 can be provided to couple to up to six different dipole antennas. For example, each of the coupling segments 204-1, 204-1, 204-3 are couple to six different dipole antennas corresponding to three different unit cells 202. Accordingly, in some implementations, a single coupling segment 204 is provided to capacitively couple dipole antennas from more than one unit cell 202.

In some implementations, the unit cell 202 boundary illustrated in FIG. 2 is shifted for practical implementation of the design. For example, the unit cell 202 boundary can be shifted left, right, up, or down when implementing the design into an antenna array 200. It should be understood that the unit cell 202 boundary is not visible as there are no dividing walls or barriers between the individual unit cells 202, but the boundary is provided for ease of illustration only.

Although the antenna arrays described herein as provided in a triangular lattice, various implementations are possible. The antenna arrays can be provided in any suitable arrangement in a PCB to transmit and receive signals. For example, the antenna arrays can be provided in a triangular lattice, a rectangular lattice as illustrated in FIG. 3C, or any other suitable arrangement.

Figure 3A:
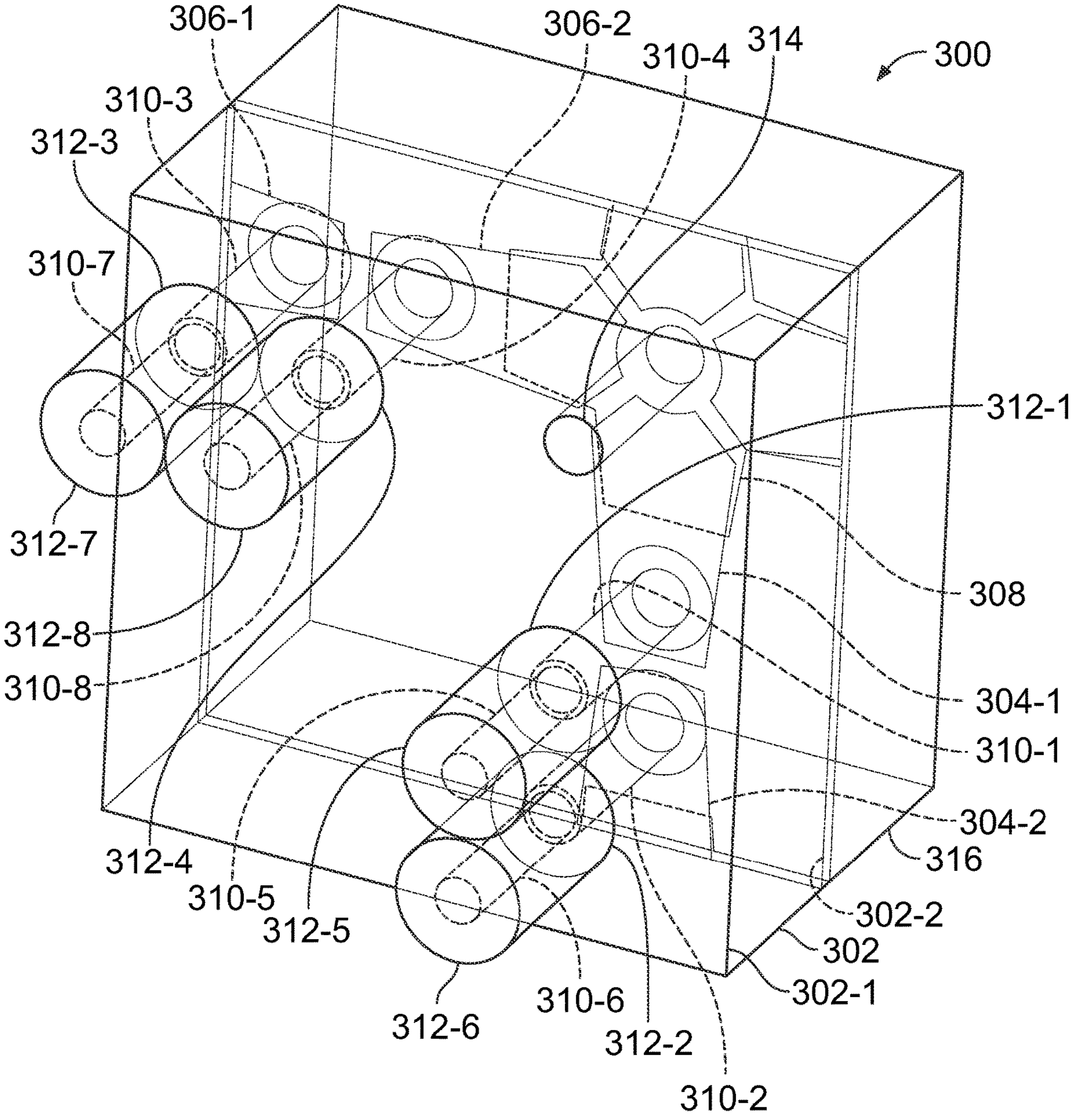
FIG. 3A illustrates a bottom perspective view of a unit cell of an antenna array according to various implementations of the present disclosure.
Figure 3B:
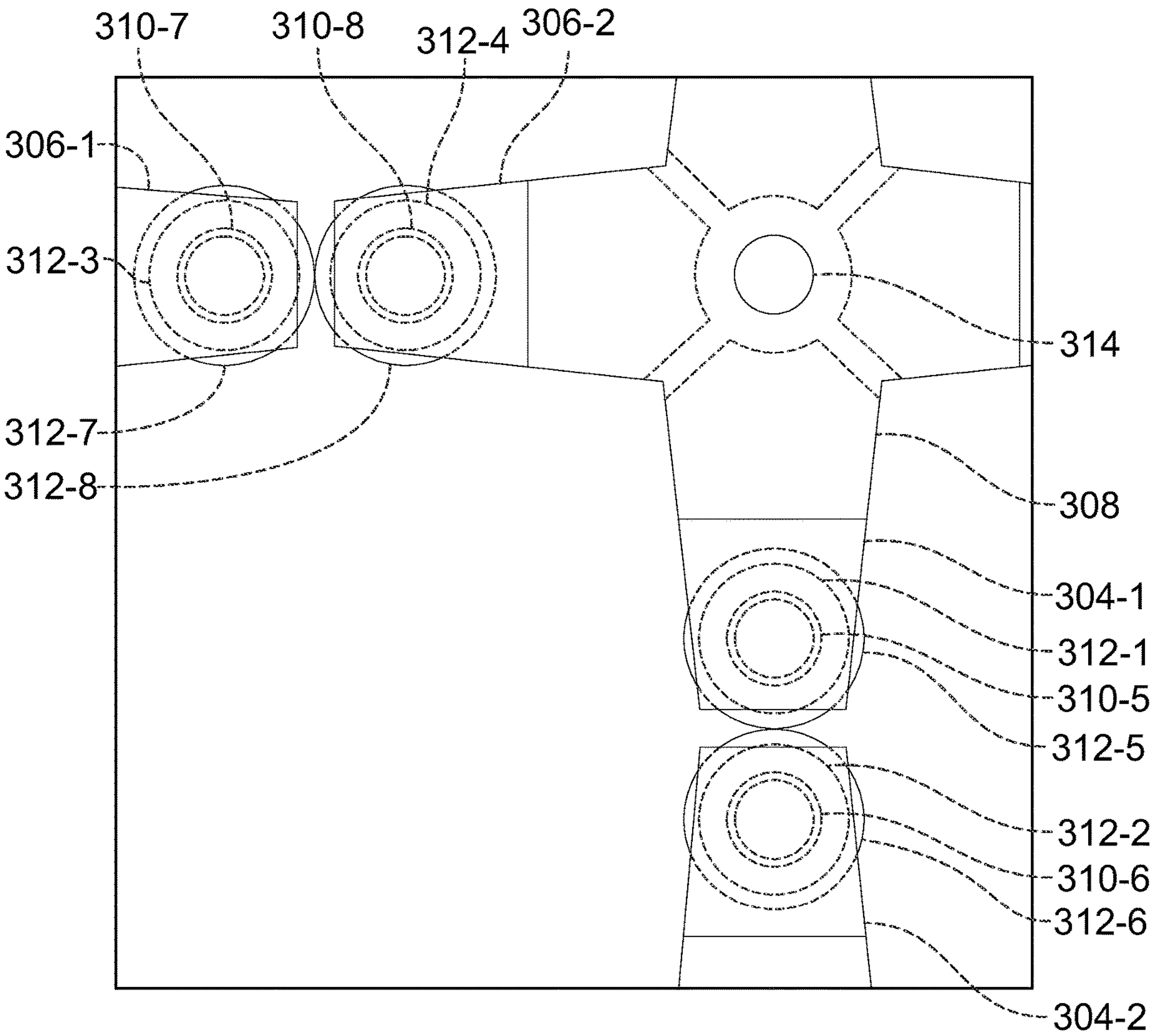
FIG. 3B illustrates a bottom view of a unit cell of an antenna array according to various implementations of the present disclosure.
Figure 3C:
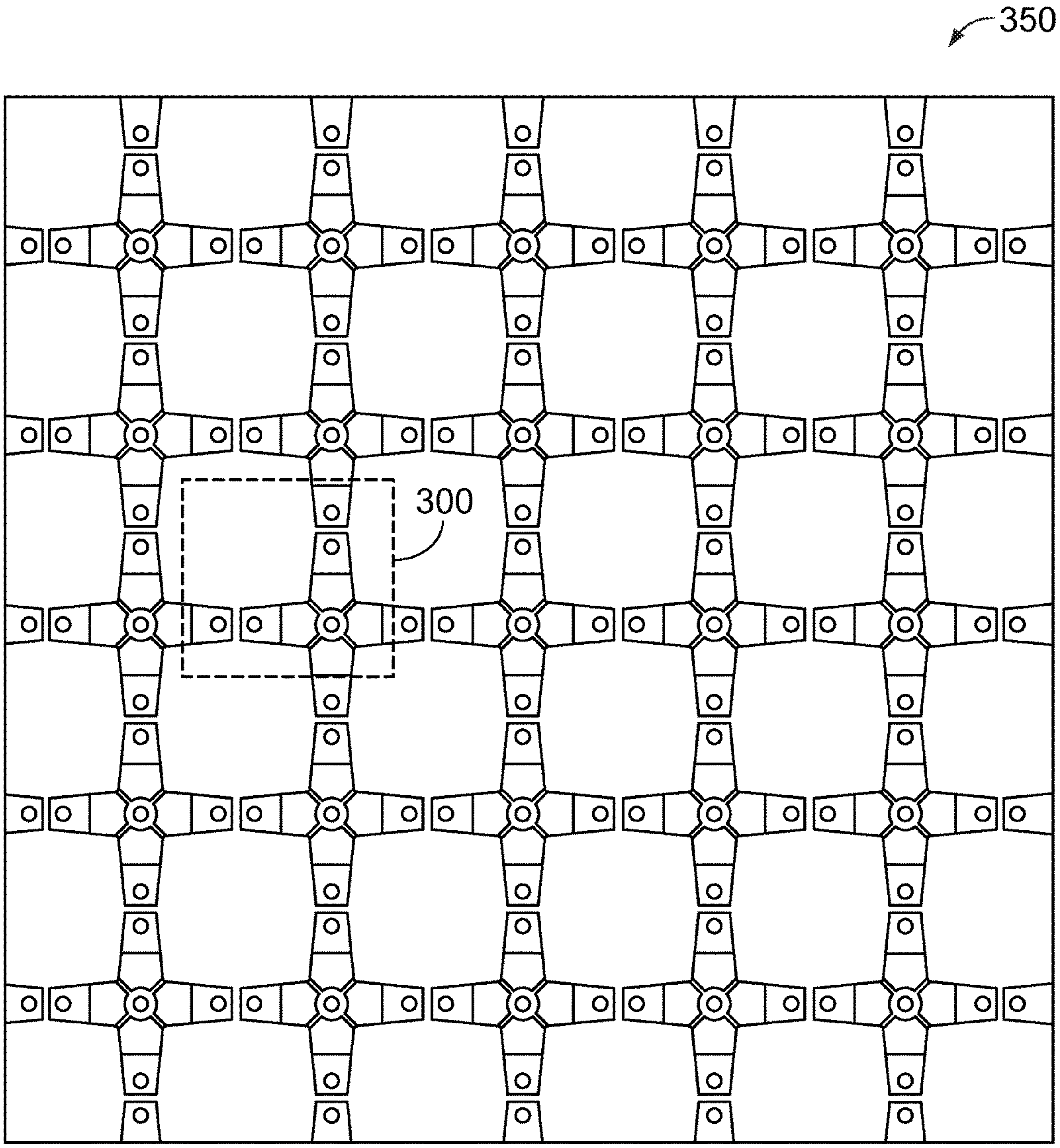
FIG. 3C illustrates a top view of an antenna array including a plurality of unit cells according to various implementations of the present disclosure.

FIG. 3A illustrates a bottom perspective view of a unit cell of an antenna array according to various implementations of the present disclosure. FIG. 3B illustrates a bottom view of a unit cell of an antenna array according to various implementations of the present disclosure. The unit cell 300 illustrated in FIGS. 3A and 3B is for illustration only. Various elements can be added to the unit cell 300, omitted from the unit cell 300, and so forth without departing from the scope of the present disclosure.

As described herein, unit cells, for example the unit cell 100, can be provided in additional configurations than the triangular array illustrated in FIGS. 1A-2. For example, FIGS. 3A and 3B illustrate a unit cell 300 provided in a rectangular array. The unit cell 300 includes a first layer 302 and a second layer 316. The first layer 302 can be the first layer 102 and comprises a dielectric substrate and can be referred to as the bottom layer. However, depending on the orientation from which the unit cell 300 is viewed, the first layer 302 can appear to be presented on a side or top of the unit cell 300. The first layer 302 includes a thin metal coating on a bottom surface 302-1 to form a signal ground and a metal coating on a top surface 302-2 where edge-coupled radiating dipole antennas are etched.

The second layer 316 is provided opposite the first layer 302. The second layer 316 comprises a dielectric superstrate and can be referred to as the top layer. However, depending on the orientation from which the unit cell 300 is viewed, the second layer 316 can appear to be presented on a side or top of the unit cell 300. The second layer 316 improves overall scan performance and serves as an environmental shield against corrosion.

The unit cell 300 further includes dipole antennas 304, 306 that are the edge-coupled radiating dipole antennas etches in the top surface 302-2 of the first layer 302. Each dipole antenna 304, 306 includes two separate dipole segments. For example, the unit cell 300 includes a first dipole antenna 304 that includes a first dipole segment 304-1 and a second dipole segment 304-2 and a second dipole antenna 306 that includes a first dipole segment 306-1 and a second dipole segment 306-2. In some implementations, each dipole segment is referred to as an arm. For example, the first dipole segment 304-1 can be referred to herein as a first dipole arm and the second dipole segment 304-2 can be referred to herein as a second dipole arm.

The unit cell 300 further includes a plurality of printed metallic coupling segments at the top surface 302-2 of the first layer 302, each of which are respectively capacitively coupled to two dipole antennas. For example, the unit cell 300 includes a coupling segment 308 that is capacitively coupled to the first dipole antenna 304 and the second dipole antenna 306. In some implementations, the coupling segment 308 is comprised of a metallic material, such as copper. The coupling segment 308 can be similar to the coupling segments 110, 112, 114. The coupling segment 308 capacitively loads the respective dipole antennas 304, 306 to offset inductance of the ground plane, i.e., the bottom surface 302-1 of the first layer 302, and increase the lower cutoff point of the impedance bandwidth as does the coupling segments 110, 112, 114 in the unit cell 100.

In some implementations, the coupling segment 308 is provided above the dipole antennas 304, 306 such that the dipole antennas 304, 306 are provided between the coupling segment 308 and the bottom surface 302-1. In other implementations, the coupling segment 308 is provided below the dipole antennas 304, 306 such that the coupling segment 308 is provided between the dipole antennas 304, 306 and the bottom surface 302-1.

The unit cell 300 further includes a plurality of vias 310. The vias 310 traverse through the first layer 302 between the bottom surface 302-1 and the top surface 302-2 at the dipole antennas 304, 306. Each dipole antenna 304, 306 is connected to one via 310 to ground the dipole antenna 304, 306 and another via 310 to connect to a coaxial feedline. In other words, for each dipole antenna, one arm is grounded by one metallic via through the substrate and the other arm is connected to the coaxial feedline by another via. This provides an economical and effective way to feed the dipole antennas over 2:1 bandwidth or more. For example, the first dipole segment 304-1 is connected to the via 310-1 and the second dipole segment 304-2 is connected to the via 310-2. Likewise, the first dipole segment 306-1 is connected to the via 310-3 and the second dipole segment 306-2 is connected to the via 310-4.

The unit cell 300 further includes a plurality of relief cutouts 312, analogous to the relief cutouts 118 of the unit cell 100. The relief cutouts 312-1, 312-2, 312-3, 312-4 are formed by etching portions of the thin metal coating on the bottom surface 302-1 to create holes in the bottom surface 302-1 where the vias 310 can extend to the top surface 302-2.

FIG. 3A further illustrates a set of additional vias 310-5, 310-6, 310-7, 310-8 that extend below the relief cutouts 312-1, 312-2, 312-3, 312-4 to additional relief cutouts 312-5, 312-6, 312-7, 312-8.

The unit cell 300 further includes one or more shorting pins 314. In some implementations, the shorting pins 314 are the same as the shorting pins 120 described herein. The shorting pin 314 traverses through the first layer 302 between the bottom surface 302-1 and the top surface 302-2 to the coupling segment 308. By implementing the shorting pin 314, unwanted common modes, or blind spots, are suppressed and extend the higher frequency without compromising low frequency extension.

FIG. 3C illustrates an antenna array including a plurality of unit cells according to various implementations of the present disclosure. The antenna array 350 illustrated in FIG. 3C is for illustration only. Various elements can be added to the antenna array 350, omitted from the antenna array 350, and so forth without departing from the scope of the present disclosure.

The antenna array 350 includes a plurality of unit cells 300. Each unit cell 300 is associated with adjacent unit cells 300. Accordingly, the antenna array 350 includes a plurality of coupling segments 308. The coupling segment 308 can be provided to couple to up to four different dipole antennas to associate the coupling segment 208 of the coupling segment 308 with additional unit cells 300. Accordingly, in some implementations, a single coupling segment 308 is provided to capacitively couple dipole antennas from more than one unit cell 300.

As shown in FIG. 3C, some dipole antennas from a single unit cell 300 are associated with more than unit cell 300 also. For example, while the unit cell 300 includes a dipole antenna 304 with a first dipole segment 304-1 and a second dipole segment 304-2 and a dipole antenna 306 with a first dipole segment 306-1 and a second dipole segment 306-2. The second dipole segment 304-2 and the first dipole segment 306-1 are each associated with the coupling segment 308 of an adjacent unit cell 300.

Although the antenna arrays described herein as provided in a rectangular lattice, various implementations are possible. The antenna arrays can be provided in any suitable arrangement in a PCB to transmit and receive signals. For example, the antenna arrays can be provided in a triangular lattice as illustrated in FIG. 2, a rectangular lattice, or any other suitable arrangement.

Figure 4:
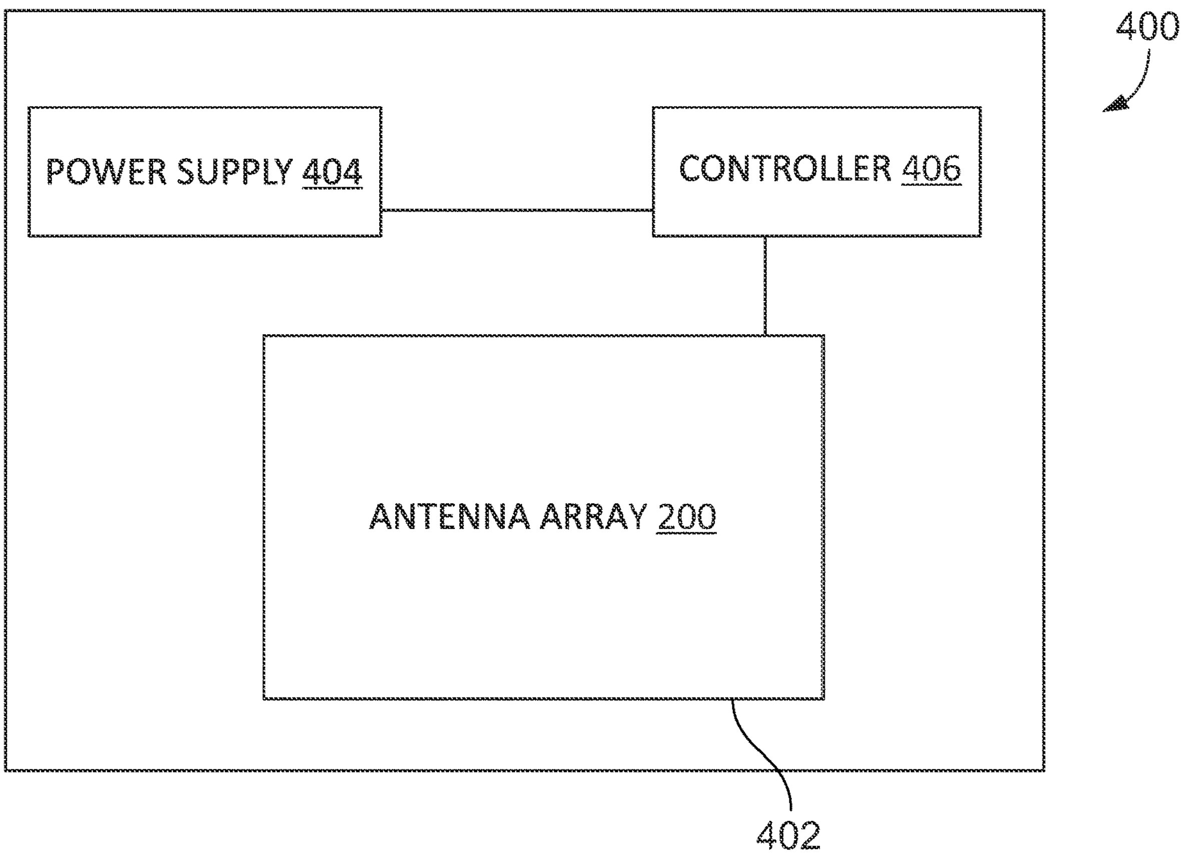
FIG. 4 illustrates a block diagram of an antenna system with an antenna array including the disclosed antenna elements in this disclosure.

FIG. 4 illustrates a block diagram of an antenna system 400 with an antenna array 402 made up of the disclosed unit cells 100 in this disclosure. In this example, the antenna system 400 includes the antenna array 402, a power supply 404, and a controller 406. In this example, the antenna system 402 is a phased array antenna ("PAA") that includes a plurality of the antenna elements that operate either transmit and/or receive modules. More specifically, the antenna system 400 may the previously discussed antenna array 200 that uses a triangular lattice of unit cells 100 or an alternatively shaped antenna array that uses the coupling segments 110, 112, 114 and shorting pins 120 as described herein. Thus, the unit cell 100 of the antenna system 400 includes corresponding radiation elements that in combination are capable of transmitting and/or receiving RF signals. For example, the unit cells 100 may be configured to operate within a K-band frequency range (e.g., about 20 GHz to 40 GHz for NATO K-band and 18 GHz to 26.5 GHz for IEEE K-band).

The power supply 404 is a device, component, and/or module that provides power to the controller 406 in the antenna system 400. The controller 406 is a device, component, and/or module that controls the operation of the antenna array 402. The controller 406 may be a processor, microprocessor, microcontroller, digital signal processor ("DSP"), or other type of device that may either be programmed in hardware and/or software. The controller 406 controls the electrical feed supplies provided to the antenna array 402, including, without limitation calibrating particular polarization, voltage, frequency, and the like of the electrical feeds. Only one line is shown between the controller 406 and the antenna array 402 for the sake of clarity, but in reality, several electrical connections and supply lines may connect the controller 406 to the antenna array 402.

In some implementations, the controller 406 supplies the particular electrical feeds to the various unit cells 100 in order to create numerous RF signals that combine, either constructively or destructively, to form a desired cumulative RF signal for transmission. RF signals emitted from each unit cell 100 in the antenna array 402 may be in phase so as to constructively produce intense radiation or out of phase to destructively create a particular RF signal. Direction may be controlled by setting the phase shift between the signals sent to different unit cells 100. The phase shift may be controlled by the controller 406 placing an appropriate phase delay or a slight time delay between signals sent to successive unit cells 100 in the array.

One antenna system 400 may be in signal communication with another antenna system 400, where signal communication refers to any type of communication and/or connection between the circuits, components, modules, and/or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical, such as, for example, conductive wires, electromagnetic wave guides, cables, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying digital formats without passing through a direct electromagnetic connection.

This antenna system 400 provides a means to send (or receive) RF signals to (or from) airborne or mobile vehicles with an agile electronically scanning antenna array beam without mechanical moving parts. The antenna system 400 may be used in communications systems and other applications, including, without limitation, for radar/sensor, electronic warfare, military applications, mobile communications, and the like. The antenna system 400 provides a high-performance, light-weight, low-profile and affordable solution to meet challenging and evolving mission requirements.

Implementations of the disclosure are described in the general context of computer-executable instructions, such as program modules, executed by one or more computers or other devices in software, firmware, hardware, or a combination thereof. In one example, the computer-executable instructions are organized into one or more computer-executable components or modules. Generally, program modules include, but are not limited to, routines, programs, objects, components, and data structures that perform particular tasks or implement particular abstract data types. In one example, aspects of the disclosure are implemented with any number and organization of such components or modules. For example, aspects of the disclosure are not limited to the specific computer-executable instructions or the specific components or modules illustrated in the figures and described herein. Other examples of the disclosure include different computer-executable instructions or components having more or less functionality than illustrated and described herein. In implementations involving a general-purpose computer, aspects of the disclosure transform the general-purpose computer into a special-purpose computing device when configured to execute the instructions described herein.

Figure 5:
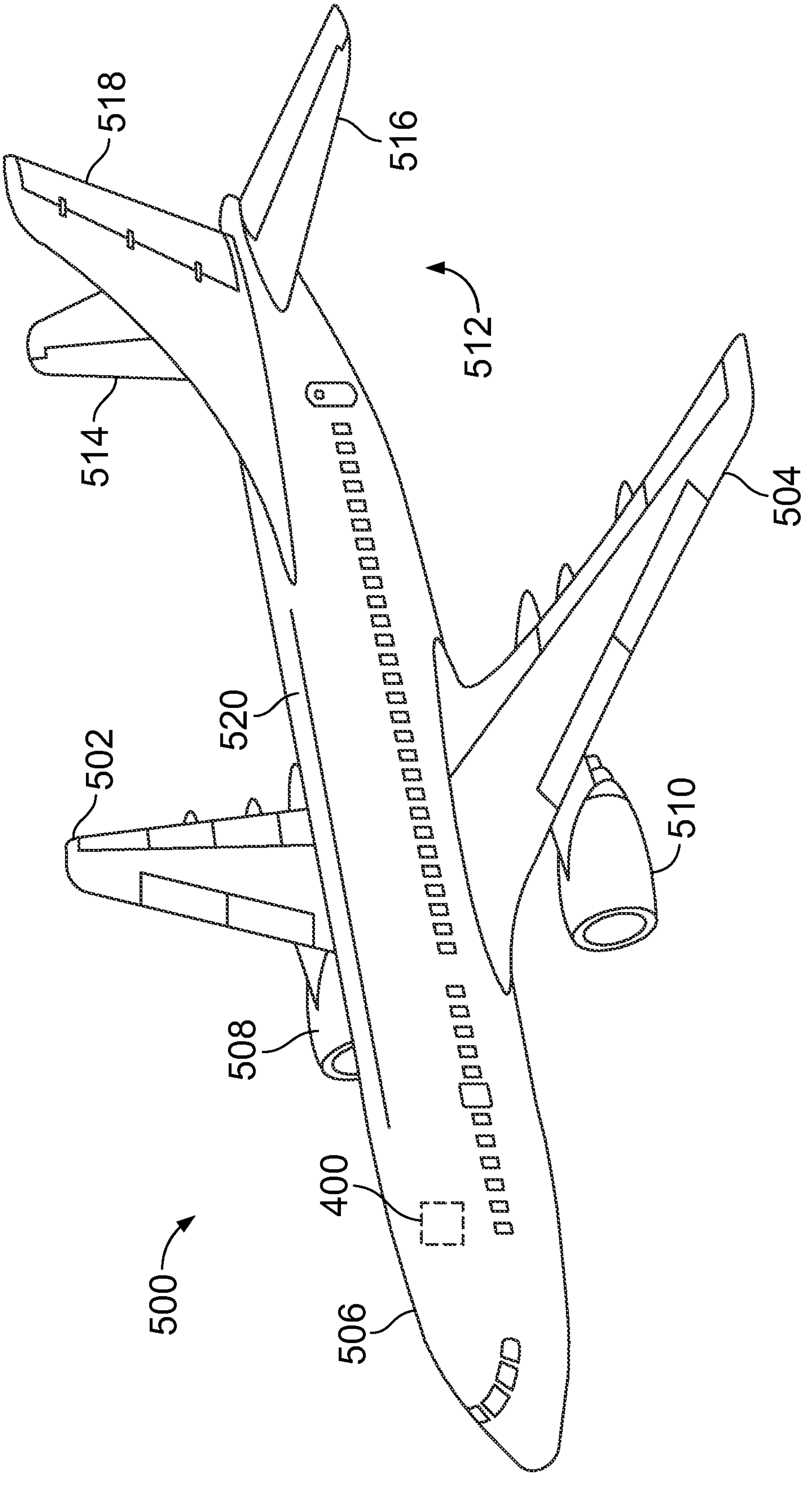
FIG. 5 illustrates a perspective view of an aircraft having one or more array antennas including the disclosed antenna elements of the present disclosure.

FIG. 5 illustrates a perspective view of an aircraft having an antenna array 400 according to various implementations of the present disclosure. The aircraft 500 includes a wing 502 and a wing 504 attached to a body 506. The aircraft 500 also includes an engine 508 attached to the wing 502 and an engine 510 attached to the wing 504. The body 506 has a tail section 512 with a horizontal stabilizer 514, a horizontal stabilizer 516, and a vertical stabilizer 518 attached to the tail section 512 of the body 506. The body 506 in some examples has a composite skin 520.

In some examples, the previously discussed antenna system 400, which includes the disclosed unit cells 100 in an antenna system 400 or just the unit cells 100 individually, may be included onto or in the aircraft 500. This is shown in FIG. 5 with a dotted box. The antenna system 400 may be positioned inside or outside of the aircraft 500.

The illustration of the aircraft 500 is not meant to imply physical or architectural limitations to the manner in which an illustrative configuration may be implemented. For example, although the aircraft 500 is a commercial aircraft, the aircraft 500 can be a military aircraft, a rotorcraft, a helicopter, an unmanned aerial vehicle, or any other suitable aircraft. Other vehicles are possible as well, such as, for example but without limitation, an automobile, a motorcycle, a bus, a boat, a train, or the like.

The following clauses describe further aspects of the present disclosure. In some implementations, the clauses described below can be further combined in any sub-combination without departing from the scope of the present disclosure.

Clause Set A:

A1: An antenna element for generating or receiving a radio frequency (RF) signal, comprising:

- a dielectric layer including a first surface and a second surface opposite the first surface;
- a first dipole antenna comprising a first antenna segment and a second antenna segment, the first dipole antenna formed in the second surface;
- a second dipole antenna comprising a first antenna segment and a second antenna segment, the second dipole antenna formed in the second surface;
- a coupling segment capacitively coupled to each of the second antenna segment of the first dipole antenna and the second antenna segment of the second dipole antenna; and a shorting pin capacitively coupled to the coupling segment and extending from the first surface to the second surface.

A2: The antenna element of A1, further comprising:

a first plurality of vias extending from the first dipole antenna and the second dipole antenna, respectively, to the first surface to electrically connect the first dipole antenna and the second dipole antenna to the first surface; and a second plurality of vias extending from the first dipole antenna and the second dipole antenna, respectively, to the first surface to connect a first feedline to the first surface and a second feedline to the first surface.

A3: The antenna element of A1, wherein the second surface of the dielectric layer is provided between the coupling segment and the first surface of the dielectric layer.

A4: The antenna element of A1, wherein the second antenna segment of the first dipole antenna and the first antenna segment of the second dipole antenna intersect at an angle of sixty degrees.

A5: The antenna element of A1, wherein the coupling segment comprises a dielectric metallic material.

A6: The antenna element of A1, further comprising:

a third dipole antenna comprising a first antenna segment and a second antenna segment, the third dipole antenna formed in the second surface.

A7: The antenna element of A6, further comprising:

a second coupling segment capacitively coupled to the first antenna segment of the first dipole antenna and the second antenna segment of the third dipole antenna; and a third coupling segment capacitively coupled to the first antenna segment of the second dipole antenna and the first antenna segment of the third dipole antenna.

A8: The antenna element of A7, further comprising:

a second shorting pin capacitively coupled to the second coupling segment and extending from the first surface to the second surface; and a third shorting pin capacitively coupled to the third coupling segment and extending from the first surface to the second surface.

A9: The antenna element of A7, wherein the first dipole antenna, the second dipole antenna, and the third dipole antenna are arranged in a triangular arrangement such that the first dipole antenna and the second dipole antenna intersect at an angle of sixty degrees, the first dipole antenna and the third dipole antenna intersect at an angle of sixty degrees, and the second dipole antenna and the third dipole antenna intersect at an angle of sixty degrees.

Clause Set B:

B1: A phased antenna array for generating or receiving a radio frequency (RF) signal, the phased antenna array comprising:

a plurality of unit cells provided in a triangular lattice arrangement, each unit cell comprising:

a dielectric layer including a first surface and a second surface opposite the first surface;

a first dipole antenna comprising a first antenna segment and a second antenna segment, the first dipole antenna formed in the second surface;

a second dipole antenna comprising a first antenna segment and a second antenna segment, the second dipole antenna formed in the second surface;

a coupling segment capacitively coupled to each of the second antenna segment of the first dipole antenna and the second antenna segment of the second dipole antenna; and a shorting pin capacitively coupled to the coupling segment and extending from the first surface to the second surface.

B2: The phased antenna array of B1, wherein the plurality of unit cells are arranged in a common plane.

B3: The phased antenna array of B1, wherein each unit cell further comprises:

a first plurality of vias extending from the first dipole antenna and the second dipole antenna, respectively, to the first surface to electrically connect the first dipole antenna and the second dipole antenna to the first surface; and a second plurality of vias extending from the first dipole antenna and the second dipole antenna, respectively, to the first surface to connect a first feedline to the first surface and a second feedline to the first surface.

B4: The phased antenna array of B1, the second surface of the dielectric layer is provided between the coupling segment and the first surface of the dielectric layer.

B5: The phased antenna array of B1, wherein the second antenna segment of the first dipole antenna and the first antenna segment of the second dipole antenna intersect at an angle of sixty degrees.

B6: The phased antenna array of B1, wherein each unit cell further comprises:

a third dipole antenna comprising a first antenna segment and a second antenna segment, the third dipole antenna formed in the second surface.

B7: The phased antenna array of B6, wherein, in each unit cell, the first dipole antenna, the second dipole antenna, and the third dipole antenna are arranged in a triangular arrangement such that the first dipole antenna and the second dipole antenna intersect at an angle of sixty degrees, the first dipole antenna and the third dipole antenna intersect at an angle of sixty degrees, and the second dipole antenna and the third dipole antenna intersect at an angle of sixty degrees.

Clause Set C:

C1: An antenna element for generating or receiving a radio frequency (RF) signal, comprising:

a dielectric layer including a first surface and a second surface opposite the first surface;

a plurality of dipole antennas arranged in a triangular arrangement, including:

a first dipole antenna comprising a first antenna segment and a second antenna segment, the first dipole antenna etched into the second surface, a second dipole antenna comprising a first antenna segment and a second antenna segment, the second dipole antenna etched into the second surface, a third dipole antenna comprising a first antenna segment and a second antenna segment, the third dipole antenna etched into the second surface;

a plurality of coupling segments comprising a dielectric metallic material, the plurality of coupling segments including:

a first coupling segment capacitively coupled to each of the second antenna segment of the first dipole antenna and the second antenna segment of the second dipole antenna, a second coupling segment capacitively coupled to the first antenna segment of the first dipole antenna and the second antenna segment of the third dipole antenna, and a third coupling segment capacitively coupled to the first antenna segment of the second dipole antenna and the first antenna segment of the third dipole antenna; and a plurality of shorting pins extending from the first surface to the second surface, the plurality of shorting pins including:

a first shorting pin capacitively coupled to the first coupling segment, a second shorting pin capacitively coupled to the second coupling segment, and a third shorting pin capacitively coupled to the first coupling segment.

C2: The antenna element of C1, wherein the first dipole antenna and the second dipole antenna intersect at an angle of sixty degrees, the first dipole antenna and the third dipole antenna intersect at an angle of sixty degrees, and the second dipole antenna and the third dipole antenna intersect at an angle of sixty degrees.

C3: The antenna element of C1, further comprising:

a first plurality of vias extending from the first dipole antenna, the second dipole antenna, and the third dipole antenna, respectively, to the first surface to electrically connect the first dipole antenna, the second dipole antenna, and the third dipole antenna to the first surface; and a second plurality of vias extending from the first dipole antenna, the second dipole antenna, and the third dipole antenna, respectively, to the first surface to connect a first feedline, a second feedline, and a third feedline to the first surface.

C4: The antenna element of C1, wherein the plurality of shorting pins is configured to suppress unwanted common modes.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one implementation or may relate to several implementations. The implementations are not limited to those that solve any or all of the stated problems or those that have any or all of the stated benefits and advantages. It will further be understood that reference to 'an' item refers to one or more of those items.

The term "comprising" is used in this disclosure to mean including the feature(s) or act(s) followed thereafter, without excluding the presence of one or more additional features or acts.

In some implementations, the operations illustrated in the figures may be implemented as software instructions encoded on a computer readable medium, in hardware programmed or designed to perform the operations, or both. For example, aspects of the disclosure may be implemented as an ASIC, SoC, or other circuitry including a plurality of interconnected, electrically conductive elements.

The order of execution or performance of the operations in implementations of the disclosure illustrated and described herein is not essential, unless otherwise specified. That is, the operations may be performed in any order, unless otherwise specified, and implementations of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

It is to be understood that the above description is intended to be illustrative, and not restrictive. As an illustration, the above-described implementations (and/or aspects thereof) are usable in combination with each other. In addition, many modifications are practicable to adapt a particular situation or material to the teachings of the various implementations of the disclosure without departing from their scope. While the dimensions and types of materials described herein are intended to define the parameters of the various implementations of the disclosure, the implementations are by no means limiting and are exemplary implementations. Many other implementations will be apparent to those of ordinary skill in the art upon reviewing the above description. The scope of the various implementations of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. 112(f), unless and until such claim limitations expressly use the phrase "means for" followed by a statement of function void of further structure.

This written description uses examples to disclose the various implementations of the disclosure, including the best mode, and also to enable any person of ordinary skill in the art to practice the various implementations of the disclosure, including making and using any devices or systems and performing any incorporated methods. The patentable scope of the various implementations of the disclosure is defined by the claims, and includes other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

Although the present disclosure has been described with reference to various implementations, various changes and modifications can be made without departing from the scope of the present disclosure.

What is claimed is:

1. An antenna element for generating or receiving a radio frequency (RF) signal, comprising:

a dielectric layer including a first surface and a second surface opposite the first surface;

a first dipole antenna comprising a first antenna segment and a second antenna segment, the first dipole antenna formed in the second surface;

a second dipole antenna comprising a first antenna segment and a second antenna segment, the second dipole antenna formed in the second surface;

a third dipole antenna comprising a first antenna segment and a second antenna segment, the third dipole antenna formed in the second surface;

a coupling segment capacitively coupled to each of the second antenna segment of the first dipole antenna and the second antenna segment of the second dipole antenna;

a shorting pin capacitively coupled to the coupling segment and extending from the first surface to the second surface, a second coupling segment capacitively coupled to the first antenna segment of the first dipole antenna and the second antenna segment of the third dipole antenna; and a third coupling segment capacitively coupled to the first antenna segment of the second dipole antenna and the first antenna segment of the third dipole antenna.

2. The antenna element of claim 1, further comprising:

a first plurality of vias extending from the first dipole antenna and the second dipole antenna, respectively, to the first surface to electrically connect the first dipole antenna and the second dipole antenna to the first surface; and a second plurality of vias extending from the first dipole antenna and the second dipole antenna, respectively, to the first surface to connect a first feedline to the first surface and a second feedline to the first surface.

3. The antenna element of claim 1, wherein the second surface of the dielectric layer is provided between the coupling segment and the first surface of the dielectric layer.

4. The antenna element of claim 1, wherein the second antenna segment of the first dipole antenna and the first antenna segment of the second dipole antenna intersect at an angle of sixty degrees.

5. The antenna element of claim 1, wherein the coupling segment comprises a metallic material.

6. The antenna element of claim 1, further comprising:

a second shorting pin capacitively coupled to the second coupling segment and extending from the first surface to the second surface; and a third shorting pin capacitively coupled to the third coupling segment and extending from the first surface to the second surface.

7. The antenna element of claim 1, wherein the first dipole antenna, the second dipole antenna, and the third dipole antenna are arranged in a triangular arrangement such that the first dipole antenna and the second dipole antenna intersect at an angle of sixty degrees, the first dipole antenna and the third dipole antenna intersect at an angle of sixty degrees, and the second dipole antenna and the third dipole antenna intersect at an angle of sixty degrees.

8. A phased antenna array for generating or receiving a radio frequency (RF) signal, the phased antenna array comprising:

a plurality of unit cells provided in a triangular lattice arrangement, each unit cell comprising:

a dielectric layer including a first surface and a second surface opposite the first surface;

a first dipole antenna comprising a first antenna segment and a second antenna segment, the first dipole antenna formed in the second surface;

a second dipole antenna comprising a first antenna segment and a second antenna segment, the second dipole antenna formed in the second surface;

a coupling segment capacitively coupled to each of the second antenna segment of the first dipole antenna and the second antenna segment of the second dipole antenna; and a shorting pin capacitively coupled to the coupling segment and extending from the first surface to the second surface.

9. The phased antenna array of claim 8, wherein the plurality of unit cells are arranged in a common plane.

10. The phased antenna array of claim 8, wherein each unit cell further comprises:

a first plurality of vias extending from the first dipole antenna and the second dipole antenna, respectively, to the first surface to electrically connect the first dipole antenna and the second dipole antenna to the first surface; and a second plurality of vias extending from the first dipole antenna and the second dipole antenna, respectively, to the first surface to connect a first feedline to the first surface and a second feedline to the first surface.

11. The phased antenna array of claim 8, the second surface of the dielectric layer is provided between the coupling segment and the first surface of the dielectric layer.

12. The phased antenna array of claim 8, wherein the second antenna segment of the first dipole antenna and the first antenna segment of the second dipole antenna intersect at an angle of sixty degrees.

13. The phased antenna array of claim 8, wherein each unit cell further comprises:

a third dipole antenna comprising a first antenna segment and a second antenna segment, the third dipole antenna formed in the second surface.

14. The phased antenna array of claim 13, wherein, in each unit cell, the first dipole antenna, the second dipole antenna, and the third dipole antenna are arranged in a triangular arrangement such that the first dipole antenna and the second dipole antenna intersect at an angle of sixty degrees, the first dipole antenna and the third dipole antenna intersect at an angle of sixty degrees, and the second dipole antenna and the third dipole antenna intersect at an angle of sixty degrees.

15. An antenna element for generating or receiving a radio frequency (RF) signal, comprising:

a dielectric layer including a first surface and a second surface opposite the first surface;

a plurality of dipole antennas arranged in a triangular arrangement, including:

a first dipole antenna comprising a first antenna segment and a second antenna segment, the first dipole antenna etched into the second surface, a second dipole antenna comprising a first antenna segment and a second antenna segment, the second dipole antenna etched into the second surface, a third dipole antenna comprising a first antenna segment and a second antenna segment, the third dipole antenna etched into the second surface;

a plurality of coupling segments, the plurality of coupling segments including:

a first coupling segment capacitively coupled to each of the second antenna segment of the first dipole antenna and the second antenna segment of the second dipole antenna, a second coupling segment capacitively coupled to the first antenna segment of the first dipole antenna and the second antenna segment of the third dipole antenna, and a third coupling segment capacitively coupled to the first antenna segment of the second dipole antenna and the first antenna segment of the third dipole antenna; and a plurality of shorting pins extending from the first surface to the second surface, the plurality of shorting pins including:

a first shorting pin capacitively coupled to the first coupling segment, a second shorting pin capacitively coupled to the second coupling segment, and a third shorting pin capacitively coupled to the first coupling segment.

16. The antenna element of claim 15, wherein the first dipole antenna and the second dipole antenna intersect at an angle of sixty degrees, the first dipole antenna and the third dipole antenna intersect at an angle of sixty degrees, and the second dipole antenna and the third dipole antenna intersect at an angle of sixty degrees.

17. The antenna element of claim 15, further comprising:

a first plurality of vias extending from the first dipole antenna, the second dipole antenna, and the third dipole antenna, respectively, to the first surface to electrically connect the first dipole antenna, the second dipole antenna, and the third dipole antenna to the first surface; and a second plurality of vias extending from the first dipole antenna, the second dipole antenna, and the third dipole antenna, respectively, to the first surface to connect a first feedline, a second feedline, and a third feedline to the first surface.

18. The antenna element of claim 15, wherein the plurality of shorting pins is configured to suppress unwanted common modes.

19. The antenna element of claim 15, wherein the plurality of coupling segments comprise a metallic material.

20. The antenna element of claim 17, wherein the plurality of shorting pins is configured to suppress unwanted common modes.

* * * * *